United States Patent
Moon et al.

(10) Patent No.: US 8,548,234 B2
(45) Date of Patent: Oct. 1, 2013

(54) METHOD AND APPARATUS FOR SIMULTANEOUSLY REDUCING VARIOUS KINDS OF NOISES FROM IMAGE

(75) Inventors: Young-su Moon, Seoul (KR); Si-hwa Lee, Seoul (KR); Ho-lin Lee, Seoul (KR); Young-jin Yoo, Guri-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1229 days.

(21) Appl. No.: 12/010,442

(22) Filed: Jan. 24, 2008

(65) Prior Publication Data

US 2009/0052775 A1    Feb. 26, 2009

(30) Foreign Application Priority Data

Aug. 24, 2007  (KR) ........................ 10-2007-0085556

(51) Int. Cl.
*G06K 9/00*    (2006.01)

(52) U.S. Cl.
USPC ........... 382/167; 382/162; 382/176; 382/201; 382/168; 382/166

(58) Field of Classification Search
USPC .................. 382/167, 162, 176, 201, 168, 166
See application file for complete search history.

(56) References Cited

U.S. PATENT DOCUMENTS

| | | | |
|---|---|---|---|
| 6,229,578 B1 * | 5/2001 | Acharya et al. | ............... 348/607 |
| 6,625,325 B2 | 9/2003 | Gindele et al. | |
| 2003/0095717 A1 | 5/2003 | Gindele et al. | |
| 2005/0276510 A1 | 12/2005 | Bosco et al. | |
| 2008/0292182 A1 * | 11/2008 | Morales et al. | ............... 382/162 |

FOREIGN PATENT DOCUMENTS

| | | |
|---|---|---|
| JP | 10-084552 | 3/1998 |
| JP | 2001-175843 | 6/2001 |
| JP | 2003-153290 | 5/2003 |
| KR | 10-2006-0019897 | 3/2006 |
| KR | 10-2007-0040026 | 4/2007 |

OTHER PUBLICATIONS

Abreu et al: "A new efficient approach for the removal of impulse noise from highly corrupted images", IEEE-IP, 1996.*
Bosco, A. et al., *Fast Method for Noise Level Estimation and Integrated Nose Reduction*, IEEE Transactions on Consumer Electronics, vol. 51, Issue 3, pp. 1028-1033, Aug. 2005 (6 pages).

(Continued)

*Primary Examiner* — Samir A. Ahmed
*Assistant Examiner* — Ruiping Li
(74) *Attorney, Agent, or Firm* — Staas & Halsey LLP (57) ABSTRACT

Provided are a method and apparatus for simultaneously reducing various kinds of noises in an image output from an image sensor equipped to a camera. The image noise reducing method includes: determining a color reference value, which corresponds to a corrected value of the color value of a current pixel, based on the difference values between the color value of the current pixel among pixels of an image and the color values of neighboring pixels around the current pixel; determining unified filter kernel coefficients, which represent the weights of the current pixel and the neighboring pixels, based on the similarities between the determined color reference value and the color values of the neighboring pixels; and reducing a noise in the color value of the current pixel by weighted-averaging the color value of the current pixel and the color values of the neighboring pixels using the unified filter kernel coefficients.

13 Claims, 7 Drawing Sheets
(1 of 7 Drawing Sheet(s) Filed in Color)

(56) References Cited

OTHER PUBLICATIONS

Garnett, R. et al., *A Universal Noise Removal Algorithm With an Impulse Detector*, IEEE transactions on image processing, vol. 14, No. 11, pp. 1747-1754, Nov. 2005 (8 pages).

Huang Y. et al., *An adaptive filter for additive Gaussian and impulse noise reduction in video signals*, Proceedings of the 2003 Joint Conference of the Fourth International Conference, Dec. 15-18, 2003, vol. 1, pp. 523-526 (4 pages).

Keigo Hirakawa et al., "Joint Demosaicing and Denoising", IEEE Transactions in Image Processing, vol. 15, No. 8, Aug. 2006, pp. 2146-2157.

Ossi Kalevo et al., "Noise Reduction Techniques for Bayer-Matrix Images", Proceedings of SPIE, vol. 4669, 2002, pp. 348-359.

Shapiro et al., "Filtering and Enhancing Images", Chapter 5, 2001, pp. 136-141.

Sylvain Paris et al., "A Fast Approximation of the Bilateral Filter using a Signal Processing Approach," Massachusetts Institute of Technology, Computer Science and Artificial Intelligence Laboratory, pp. 1-12, 2006.

Yong Huang et al., "An Adaptive Spatial Filter for Additive Gaussian and Impulse Noise Reduction in Video Signals," STMicroelectronics Asia Pacific Pte Ltd., ICICS-PCM, Dec. 15-18, 2003, Singapore, pp. 1-4.

C. Tomasi et al., "Bilateral Filtering for Gray and Color Images," Proceedings of the 1998 IEEE International Conference on Computer Vision, Bombay India, pp. 1-8.

Suk Hwan Lim, "Characterization of Noise in Digital Photographs for Image Processing," HP Laboratories HPL-2008-159, IS&T/SPIE Electronic Imaging vol. 6069 pp. 1-11.

Lin Yin et al., "Weighted Median Filters: A Tutorial," Circuits and Systems Exposition, IEEE Transactions on Circuits and Systems—II: Analog and Digital Signal Processing, vol. 43, No. 3, Mar. 1996 pp. 157-192.

\* cited by examiner

METHOD AND APPARATUS FOR SIMULTANEOUSLY REDUCING VARIOUS KINDS OF NOISES FROM IMAGE

CROSS-REFERENCE TO RELATED PATENT APPLICATIONS

This application claims the benefit of Korean Patent Application No. 10-2007-0085556, filed on Aug. 24, 2007, in the Korean Intellectual Property Office, the disclosure of which is incorporated herein in its entirety by reference.

BACKGROUND OF THE INVENTION

1. Field of the Invention

The present invention relates to a method and apparatus for simultaneously reducing various kinds of noises in an image output from an image sensor equipped to a camera, and more particularly, to a method and apparatus for simultaneously reducing a white Gaussian noise and an impulse noise in a color filter array (CFA) Bayer pattern image output from an image sensor.

2. Description of the Related Art

An image sensor attached to a camera converts light entering from an external source into an electrical signal. Image sensors are being applied to various digital image media, such as portable multimedia players (PMPs), mobile phones, etc., in addition to cameras. Recently, it has been intended to equip vehicles with such cameras in order to monitor driving environments. This application of image sensors to various digital image media devices is becoming more popular. In particular, when an image output from an image sensor is reproduced on a high-resolution display panel, noises included in the image appear. For this reason, the technology of removing noises from an image output from the image sensor is being considered as a core technology.

Representative examples of image noises include a white Gaussian noise and an impulse noise. The white Gaussian noise refers to a noise which statistically always exists in a wide frequency range in the form of being overlapped with the original signal. In order to reduce the white Gaussian noise included in an image, a color value of a particular pixel of the image is corrected by appropriately weighted-averaging the color value of the particular pixel and color values of neighboring pixels.

Meanwhile, the impulse noise refers to an instantaneous sharp noise which has completely different features from those of an original signal. In general, the impulse noise generates in an internal circuit of a device or a transmission path. In particular, in cameras, the impulse noise is generated during an image capturing process performed by an image sensor. In order to reduce the impulse noise included in an image, the median value among the color values of neighboring pixels around a current pixel of the image is used as the pixel value of the current pixel.

Recently, a huge amount of research into a unified filter for simultaneously removing the white Gaussian noise and the impulse noise has been performed. Representative examples of such research into the unified filter are as follows: "A universal noise removal algorithm with an impulse detector" (Roman GARNETT, Timothy HUEGERICH, Charles CHUI, WENJIE HE, IEEE transactions on image processing, Volume 14, Number 11, Page 1747-1754, November 2005); "An adaptive spatial filter for additive Gaussian and impulse noise reduction in video signals" (Yong HuangHui, L., Proceedings of the 2003 Joint Conference of the Fourth International Conference, 15-18 Dec. 2003, Volume 1, Page 523-526; and "Fast method for noise level estimation and integrated noise reduction" (Bosco, A. Bruna, A. Messina, G. Spampinato, G., IEEE Transactions on Consumer Electronics, Volume 51, Issue 3, Page 1028-1033, August 2005).

However, these conventional unified filters requires a complicated computing process and may lead to the blurring of fine details of the image after being applied to reduce noises in the image.

SUMMARY OF THE INVENTION

The present invention provides an image noise reducing method and apparatus which can solve the problem of complexity of the conventional unified filter and simultaneously maintain fine details of the image intact.

The present invention also provides a computer readable recording medium having embodied thereon a program for the image noise reducing method.

It would be obvious to those of ordinary skill in the art that the objects of the present invention to be achieved are not limited to the above-described objects, and there may be other objects.

According to an aspect of the present invention, there is provided an image noise reducing method comprising: determining a color reference value, which corresponds to a corrected value of the color value of a current pixel, based on the difference values between the color value of the current pixel among pixels of an image and the color values of neighboring pixels around the current pixel; determining coefficients, which represent the weights of the current pixel and the neighboring pixels, based on the similarities between the determined color reference value and the color values of the neighboring pixels; and reducing the noise in the color value of the current pixel by weighted-averaging the color value of the current pixel and the color values of the neighboring pixels using the determined coefficients.

According to another aspect of the present invention, there is provided a computer readable recording medium having embodied thereon a program for the above-described image noise reducing method.

According to another aspect of the present invention, there is provided an image noise reducing apparatus comprising: a color reference value determination unit determining a color reference value, which corresponds to a corrected value of the color value of a current pixel, based on the difference values between the color value of the current pixel among pixels of an image and the color values of neighboring pixels around the current pixel; a coefficient determination unit determining coefficients, which represent the weights of the current pixel and the neighboring pixels, based on the similarities between the determined color reference value and the color values of the neighboring pixels; and a noise reduction unit reducing the noise in the color value of the current pixel by weighted-averaging the color value of the current pixel and the color values of the neighboring pixels using the determined coefficients.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The above and other features and advantages of the present invention will become more apparent by describing in detail exemplary embodiments thereof with reference to the attached drawings in which.

DETAILED DESCRIPTION OF THE INVENTION

Hereinafter, exemplary embodiments of the present invention will be described with reference to the appended drawings.

Figure 1:
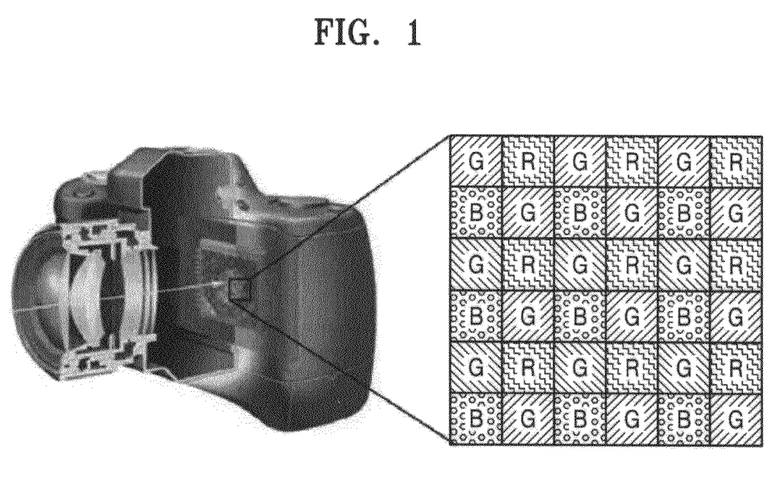
FIG. 1 illustrates a color filter array (CFA) Bayer pattern image output from an image sensor equipped to a camera.

FIG. 1 illustrates a color filter array (CFA) Bayer pattern image output from an image sensor equipped to a camera.

In general, image sensors include a CFA. Most of the image sensors include a CFA Bayer pattern, as shown in FIG. 1, developed by Dr. Bryce E. Bayer of Eastman Kodak. Referring to FIG. 1, in the CFA Bayer pattern image, green (G) channels occupy 50% of the pixels, and red (R) and blue (B) channels occupy 25%, respectively, of the pixels. In other words, each of the pixels of the CFA Bayer pattern image output from the image sensor has only one color component among the three, i.e., R, G, and B, color components. A full color image in which each pixel has all the R, G, and C color components is created by interpolating each of the pixels of the CFA Bayer pattern image.

Figure 2A:
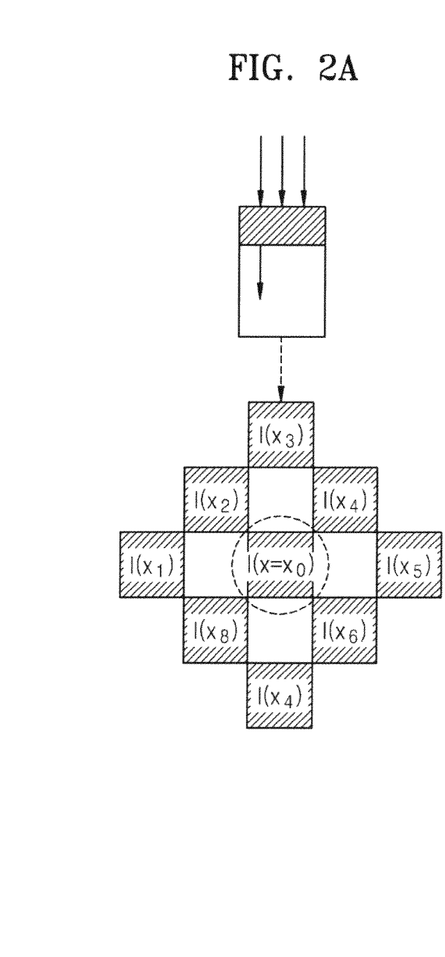
FIGS. 2A, 2B, and 2C illustrate pixels of each color channel of the CFA Bayer pattern image shown in FIG. 1.
Figure 2B:
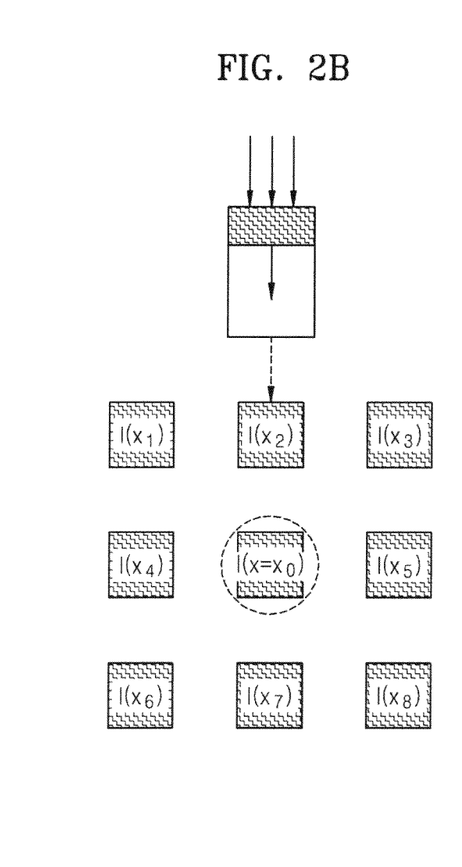
Figure 2C:
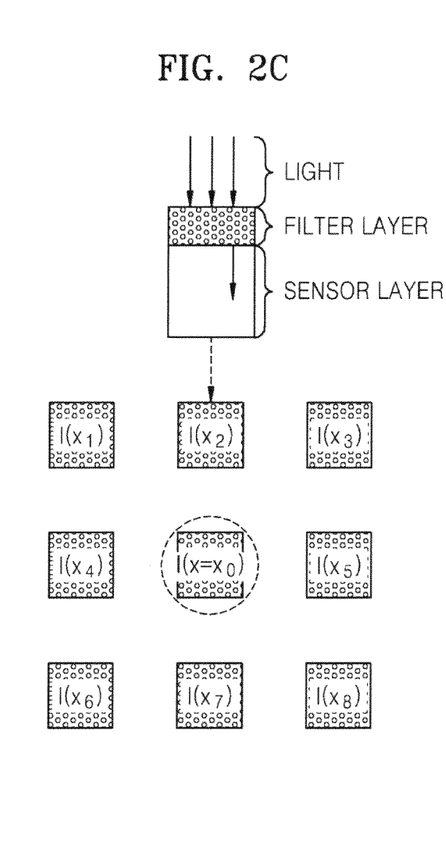

FIG. 2 illustrates pixels of each color channel of the CFA Bayer pattern image shown in FIG. 1.

Referring to FIG. 2, each pixel of the CFA Bayer pattern image includes a filter layer and a sensor layer. The filter layer passes only one of the three R, G, and B color components, whereas the sensor layer senses a brightness value of the color component output from the filter layer. In FIG. 2, (a) illustrates pixels of a G channel, (b) illustrates pixels of an R channel, and (C) illustrates pixels of a B channel.

A pixel in the center of the pixels of the G channel illustrated in (a) of FIG. 2 is a pixel which is being processed by an image noise reducing apparatus. This pixel will be simply referred to, hereinafter, as "current pixel", which is the same for (b) and (c) of FIG. 2. In addition, hereinafter, the CFA Bayer pattern image output from an image sensor 31 will be simply referred to as "image". In addition, although the exemplary embodiments of the present invention are described below in the aspect of reducing the noise in a color value of a specific pixel for simplicity matters, it would be obvious to those of ordinary skill in the art that the process described in each embodiment is repeatedly performed on all the pixels constituting the image.

Figure 3:
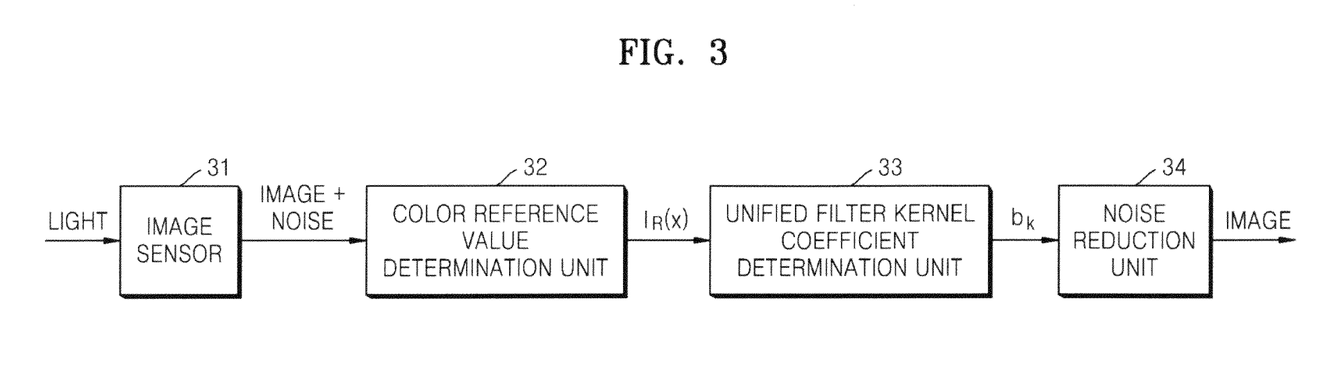
FIG. 3 is a block diagram of an image noise reducing apparatus according to an embodiment of the present invention.

FIG. 3 is a block diagram of an image noise reducing apparatus according to an embodiment of the present invention.

Referring to FIG. 3, the image noise reducing apparatus according the current embodiment includes a color reference value determination unit 32, a unified filter kernel coefficient determination unit 33, and a noise reduction unit 34.

The color reference value determination unit 32 determines a color reference value $I_R(x)$, which corresponds to a corrected value of a color value $I(x)$ of a current pixel, based on the difference values between the color value $I(x)$ of the current pixel among pixels of an image output from an image sensor 31 and color values $\{I(x_k)\}$ of neighboring pixels around the current pixel. Although in the current embodiment a "color value" means a brightness value of a color, it would be obvious to those of ordinary skill in the art that the color value may be other values of the color. In addition, the image output from the image sensor 31 is the CFA Bayer pattern image illustrated in FIG. 1, and the neighboring pixels are pixels of the same color channel as the current pixel. For example, if the color channel of the current pixel is a G channel, only the pixels of the G channel among the pixels around the current pixel can be the neighboring pixels. These descriptions are the same for the embodiments described below.

An impulse noise refers to an instantaneous sharp noise which has completely different features from those of the original signal. If the current pixel includes an impulsive noise, the difference values between the color value $I(x)$ of the current pixel and the color values of the neighboring pixels are large. In the current embodiment, a "color reference value $I_R(x)$" is a corrected color value of the current pixel that is obtained by reducing the impulse noise included in the current pixel based on the difference values between the color value $I(x)$ of the current pixel and the color values $\{I(x_k)\}$ of the neighboring pixels around the current pixel.

Figure 4:
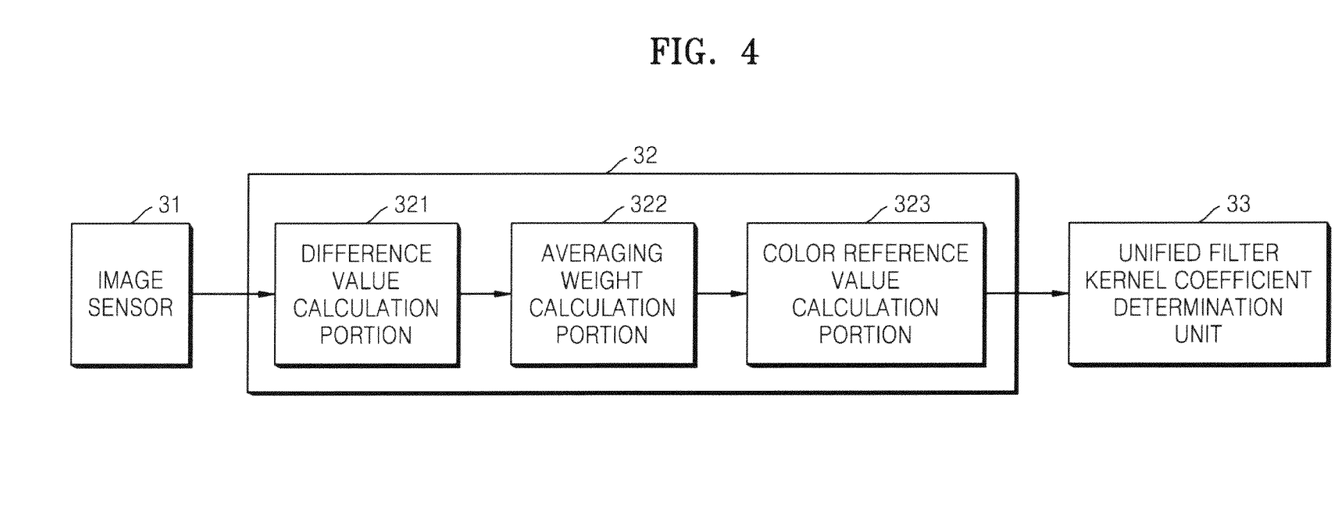
FIG. 4 is a detailed block diagram of a color reference value determination unit in FIG. 3.

FIG. 4 is a detailed block diagram of the color reference value determination unit 32.

Referring to FIG. 4, the color reference value determination unit 32 includes a difference value calculation portion 321, an averaging weight calculation portion 322, and a color reference value calculation portion 323.

According to Formula 1 below, the color value calculation portion 321 calculates the difference values between the color value $I(x)$ of the current pixel and the color values $\{I(x_k)\}$ of eight neighboring pixels which are closest to the current pixel. This is the same for the case where the current pixel belongs to the R channel or B channel.

$$r_k = |I(x_k) - I(x)|, k=1, \ldots, 8 \quad (1)$$

The averaging weight calculation portion 322 calculates an averaging weight α of the current pixel based on the average of some of the eight difference values $\{r_k\}$ calculated by the difference value calculation portion 321 and $\sigma_{in}$, which represents the level of the impulse noise component. In the current embodiment, "$\sigma_{in}$" is a value for adjusting the level of an impulse noise that is used to correct the color value of a current pixel and varies according to the photographing environment, for example, a night photographing environment.

In particular, the averaging weight calculation portion 322 calculates an average $r_{min\_avg}$ of the first and second smallest values among the eight difference values $\{r_k\}$ calculated by the difference value calculation portion 321. Next, the averaging weight calculation portion 322 divides the square of the calculated average $r_{min\_avg}$ by the product of multiplying the square of $\sigma_{in}$, which represents the level of the impulse noise, by two, and then substitutes a negative equivalent of the result of the division into the exponent function, thereby resulting in the averaging weight α according to Formula 2 below.

$$\alpha = \exp\left(-\frac{r_{min\_avg}^2}{2\sigma_{in}^2}\right) \quad (2)$$

The larger the average $r_{min\_avg}$ is, the more the averaging weight α converges on zero. The smaller the average $r_{min\_avg}$ is, the more the averaging weight α converges on 1. This means that the averaging weight α distributes from 1 to 0 in proportion to the degree of distortion of the color value I(x) of the current pixel that is caused by the impulse noise. In particular, since the averaging weight calculation portion 322 calculates the averaging weight α using the average $r_{min\_avg}$ of some of the difference values, i.e., the first and second smallest values, not all the eight difference values $\{r_k\}$ calculated by the difference value calculation portion 321, unlike the prior art, fine details of the image can be expressed. Of course, the averaging weight calculation portion 322 may calculate the average $r_{min\_avg}$ using, for example, only the first smallest value, the two smallest values, or a predetermined number of smallest values less than 5, among the eight difference values $\{rk\}$ calculated by the difference value calculation portion 321 in order to express fine details of the image. In the current embodiment, in order to effectively distinguish fine details of the image and the impulse noise from one another and effectively reduce the noise even when two subsequent impulse noises subsequently occur, the average $r_{min\_avg}$ of the two smallest values is used. Furthermore, it would be obvious to those of ordinary skill in the art that the sum of the smallest values, instead of the average $r_{min\_avg}$ can be used.

The color reference value calculation portion 323 calculates a color reference value $I_R(x)$ between the color value I(x) of the current pixel and the median value $I_M(x)$ of the neighboring pixels by using the averaging weight α, which is calculated by the averaging weight calculation portion 322. In particular, according to Formula (3) below, the color reference value calculation portion 323 multiplies the color value I(x) of the current pixel by the averaging weight α, which is calculated by the averaging weight calculation portion 322, and multiplies the median value $I_M(x)$ of the neighboring pixels by the result of subtracting the averaging weight α, which is calculated by the averaging weight calculation portion 322, from 1. Next, the color reference value calculation portion 323 calculates the color reference value $I_R(x)$ of the current pixel by summing the products of the two multiplications.

$$I_R(x) = \alpha \cdot I(x) + (1-\alpha) \cdot I_M(x) \quad (3)$$

Representative examples of noises existing in an image output from an image sensor include a white Gaussian noise and an impulse noise. The white Gaussian noise refers to a noise which statistically always exists in a wide frequency range in the form of being overlapped with the original signal. The white Gaussian noise existing in the color value I(x) of the current pixel can be reduced by appropriately weighted-averaging the color value I(x) of the current pixel and the color values of $I(x_k)$ of neighboring pixels. However, since the impulse noise is an instantaneous sharp noise which has completely different features from those of an original signal, if the color value I(x) of the current pixel and the color values $I(x_k)$ of the neighboring pixels are weighted-averaged, the resulting value may be totally different from the original color value of the current image. For this reason, in order to reduce the impulse noise, instead of the averaging weight for the color value I(x) of the current pixel and the color values $I(x_k)$ of the neighboring pixels, the median value $I_M(x)$ among the color values $I(x_k)$ of the neighboring pixels around the current pixel, can be used as the color value I(x) of the current pixel.

In other words, in the current embodiment, the "median value $I_M(x)$" is a value obtained by correcting the distortion of the color value I(x) of the current pixel that is caused by an impulse noise. As the averaging weight α becomes close to 1, i.e., as the difference between the color value I(x) of the current pixel and the color values $I(x_k)$ of the neighboring pixels becomes smaller, the color reference value calculated by the color reference value calculation portion 323 becomes close to the color value I(x) of the current pixel. As the averaging weight α becomes close to 0, i.e., as the difference values between the color value I(x) of the current pixel and the color values $I(x_k)$ of the neighboring pixels become larger, the color reference value calculated by the color reference value calculation portion 323 becomes close to the color value I(x) of the current pixel and the median value $I_M(x)$ of the color values $I(x_k)$ of the neighboring pixels. This means that the "color reference value $I_R(x)$" in the current embodiment distributes between the color value I(x) of the current pixel and the median value $I_M(x)$ of the color values $I(x_k)$ of the neighboring pixels according to the difference values between the color value I(x) of the current pixel and the color values $I(x_k)$ of the neighboring pixels. In other words, the "color reference value $I_R(x)$" in the current embodiment is a value which is corrected to enhance the effect of reducing the impulse noise when the difference values between the color value I(x) of the current pixel and the color values $I(x_k)$ of the neighboring pixels are large, and a value which is corrected to remain the original color value of the current pixel when the difference values between the color value I(x) of the current pixel and the color values $I(x_k)$ of the neighboring pixels are small.

The unified filter kernel coefficient determination unit 33 determines unified kernel coefficients $\{b_k\}$, which represent the weights of the current pixel and the neighboring pixels, based on the similarities between the color reference value $I_R(x)$, which is determined by the color reference value determination unit 32, and the color values $\{I(x_k)\}$ of the neighboring pixels. Furthermore, in order to increase the fidelity of the weight of each of the current pixel and the neighboring pixels, the unified filter kernel coefficient determination unit 33 may determine unified kernel coefficients $\{b_k\}$, which represent the weights of the current pixel and the neighboring pixels, based on the similarity and the distance between the current pixel and the neighboring pixels. It would be obvious to those of ordinary skill in the art that the unified kernel coefficients $\{b_k\}$ can be determined using other parameters in addition to the similarity and the distance.

Figure 5:
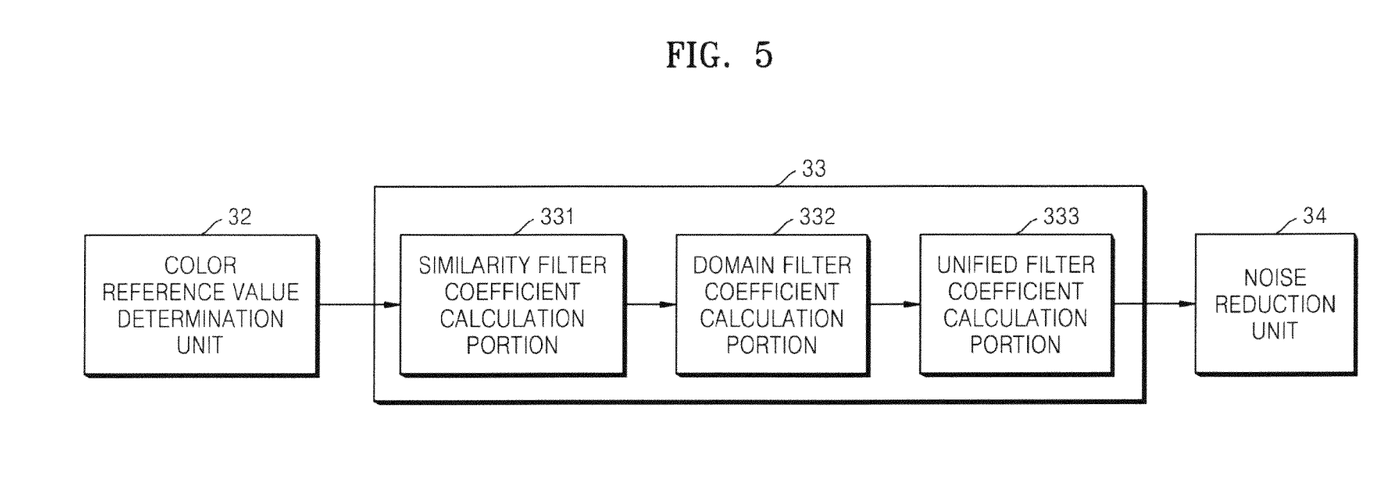
FIG. 5 is a detailed block diagram of a unified filter kernel coefficient determination unit in FIG. 3.

FIG. 5 is a detailed block diagram of the unified filter kernel coefficient determination unit 33 in FIG. 3.

Referring to FIG. 5, the unified filter kernel coefficient determination unit 33 includes a similarity filter kernel coefficient calculation portion 331, a domain filter kernel coefficient calculation portion 332, and a unified filter kernel coefficient calculation portion 333.

The similarity filter kernel coefficient calculation portion 331 calculates similarity filter kernel coefficients $\{s_k\}$, which represent the similarities between the color reference value $I_R(x)$ of the current pixel and the color values $\{I(x_k)\}$ of the neighboring pixels, based on the difference values between the color reference value $I_R(x)$ of the current pixel, which is determined by the color reference value determination unit 32, and the color values $\{I(x_k)\}$ of the neighboring pixels, and $\sigma_n$, which represents the level of the white Gaussian noise. In the current embodiment, "$\sigma_n$" is a value used to adjust the level of the white Gaussian noise component, which is used to correct the color value of the current pixel, according to the photographing environment, for example, a night photographing environment.

In particular, according to Formula 4 below, the similarity filter kernel coefficient calculation portion 331 calculates the difference values between the color reference value $I_R(x)$ of the current pixel and the color values $\{I(x_k)\}$ of the neighboring pixels and then calculates the square of each of the difference values. Next, the similarity filter kernel coefficient calculation portion 331 divides the square of each of the difference values by the product of multiplying the square of $\sigma_n$, which represents the level of the white Gaussian noise component, by 2, and then substitutes a negative equivalent of the result of the division into the exponent function, thereby resulting in the similarity filter kernel coefficients $\{s_k\}$, which represent the similarities between the color reference value $I_R(x)$ of the current pixel and the color values $\{I(x_k)\}$ of the neighboring pixels.

$$s_k = \exp\left(-\frac{(I(x_k) - I_R(x))^2}{2\sigma_n^2}\right), \quad (4)$$

$$k = 0, 1, \ldots, 8$$

As the difference values between the color reference value $I_R(x)$ of the current pixel and the color values $\{I(x_k)\}$ of the neighboring pixels become smaller, the similarity filter kernel coefficients $\{s_k\}$ calculated by the similarity filter kernel coefficient calculation portion 331 converges on 1. As the difference values between the color reference value $I_R(x)$ of the current pixel and the color values $\{I(x_k)\}$ of the neighboring pixels become larger, the similarity filter kernel coefficients $\{s_k\}$ calculated by the similarity filter kernel coefficient calculation portion 331 converges on 0. This means that the similarity filter kernel coefficients $\{s_k\}$ distribute from 1 to 0 in proportion to the degree of distortion of the color value $I(x)$ of the current pixel that is caused by the white Gaussian noise. Especially, in the current embodiment, the impulse noise is already considered in the similarity filter kernel coefficients $\{s_k\}$ calculated by the similarity filter kernel coefficient calculation portion 331, which is a great difference from the prior art.

The domain filter kernel coefficient calculation portion 332 calculates domain filter kernel coefficients $\{d_k\}$, which are inversely proportional to the distances between the current pixel and the neighboring pixels. In particular, according to Formula 5 below, the domain filter kernel coefficient calculation portion 332 divides the square of the distance between the current pixel and each of the neighboring pixels by the product of multiplying the square of $\sigma_d$, which represents an effective pixel distance, by 2, and then substitutes a negative equivalent of the result of the division into the exponent function, thereby resulting in the domain filter kernel coefficients $\{d_k\}$. In the current embodiment, "$\sigma_d$" is a value used to adjust the effective pixel distances of the neighboring pixels, which are used to correct the color value of the current pixel, according to the photographing environment, for example, a night photographing environment.

$$d_k = \exp\left(-\frac{(x_k - x)^2}{2\sigma_d^2}\right), \quad (5)$$

$$k = 0, 1, \ldots, 8$$

As the distances between the current pixel and the neighboring pixels become smaller, the domain filter kernel coefficients $\{d_k\}$ calculated by the domain filter kernel coefficient calculation portion 332 converges on 1. As the distances between the current pixel and the neighboring pixels become larger, the domain filter kernel coefficients $\{d_k\}$ calculated by the domain filter kernel coefficient calculation portion 332 converges on 0. This means that the domain filter kernel coefficients $\{d_k\}$ distributes from 1 to 0 in inverse proportion to the distances between the current pixel and the neighboring pixels.

The unified filter kernel coefficient calculation portion 333 calculates unified filter kernel coefficients $\{b_k\}$, which represent the weights of the current pixel and the neighboring pixels, based on the similarity filter kernel coefficients $\{s_k\}$ calculated by the similarity filter kernel coefficient calculation portion 331 and the domain filter kernel coefficients $\{d_k\}$ calculated by the domain filter kernel coefficient calculation portion 332. In particular, according to Formula 6 below, the unified filter kernel coefficient calculation portion 333 divides the product of multiplying the similarity filter kernel coefficient $s_k$ by the domain filter kernel coefficient $d_k$ of one of the current pixel and the neighboring pixels, which is represented as $x_k$, by the sum of the products of multiplying the similarity filter kernel coefficient $s_k$ by the domain filter kernel coefficient $d_k$ of each of the current pixel and the neighboring pixels, thereby resulting in unified filter kernel coefficient $b_k$ of the pixel $x_k$. The unified filter kernel coefficient calculation portion 333 can calculate the unified filter kernel coefficients $\{b_k\}$ of all of the current pixel and the neighboring pixels according to the method described above.

$$b_k = \frac{s_k \cdot d_k}{\sum_{m=0,1,\wedge,8}(s_m \cdot d_m)}, \quad (6)$$

$$k = 0, 1, \ldots, 8$$

Unlike conventional bilateral filter coefficients, the unified filter kernel coefficients $\{b_k\}$ calculated by the unified filter coefficient calculation portion 333 are bilateral filter kernel coefficients obtained in consideration of the impulse noise in addition to the white Gaussian noise, even though the unified filter kernel coefficients $\{b_k\}$ have the same shape as the conventional bilateral filter coefficients.

The noise reduction unit 34 reduces the noise in the color value $I(x)$ of the current pixel by weighted-averaging the color value $I(x)$ of the current pixel and the color values $\{I(x_k)\}$ of the neighboring pixels using the unified filter kernel coefficients $\{b_k\}$ determined by the unified filter kernel coefficient determination unit 33. In particular, according to Formula 7 below, the noise reduction unit 34 weighted-averages the color value $I(x)$ of the current pixel and the color values $\{I(x_k)\}$ of the neighboring pixels by performing convolution on a 3×3 pixel matrix $B(X)$, which consists of the unified filter kernel coefficients $\{b_k\}$ calculated by the unified filter kernel coefficient calculation portion 333, and a 3×3 pixel matrix $I_N(X)$, which consists of the color value $I(x)$ of the current pixel and the color values $\{I(x_k)\}$ of the neighboring pixels, and determines the result of the convolution as a new color value $I_{NR}(x)$ of the current pixel, thereby reducing the noise in the color value $I(x)$ of the current pixel.

$$I_{NR}(x) = B(x) \otimes I_N(x) \quad (7)$$

$$B(x) = \begin{bmatrix} b_1 & b_2 & b_3 \\ b_4 & b_0 & b_5 \\ b_6 & b_7 & b_8 \end{bmatrix}, I_N(x) = \begin{bmatrix} I(x_1) & I(x_2) & I(x_3) \\ I(x_4) & I(x_0) & I(x_5) \\ I(x_6) & I(x_7) & I(x_8) \end{bmatrix}$$

The unified filter kernel coefficient $b_k$ of each of the current pixel and the neighboring pixels is proportional to the similarity filter kernel coefficient $s_k$ and the domain filter kernel coefficient $d_k$. Consequently, as the color value $I(x_k)$ of a neighboring pixel is closer to the color reference value $I_R(x)$ of the color reference, and the distance between a neighboring pixel and the current pixel is smaller, the weight of the neighboring pixel is larger.

Figure 6:
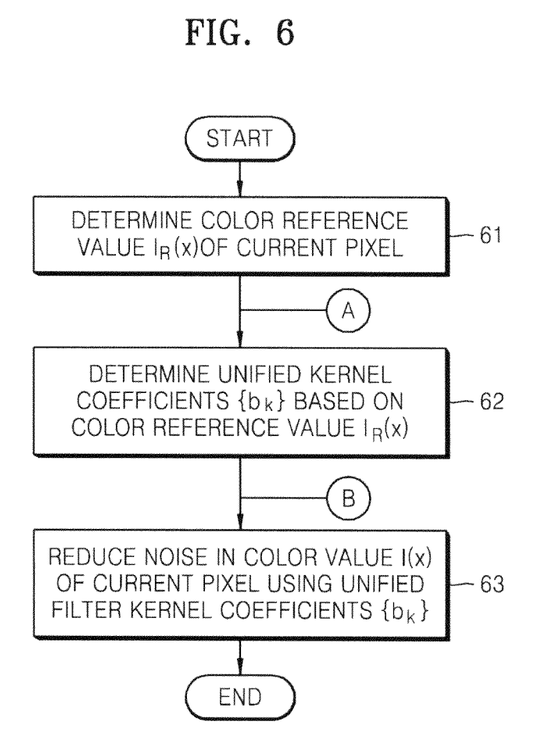
FIG. 6 is a flowchart of an image noise reducing method according to an embodiment of the present invention.

FIG. 6 is a flowchart of an image noise reducing method according to an embodiment of the present invention.

Referring to FIG. 6, the image noise reducing method according to the current embodiment of the present invention includes a plurality of operations performed in series in the image noise reducing apparatus in FIG. 1. The above descriptions on the image noise reducing apparatus illustrated in FIG. 3 are applied to the image noise reducing method according to the current embodiment of the present invention even thought not explicitly described below.

In operation 61, the image noise reducing apparatus determines a color reference value $I_R(x)$, which corresponds to a corrected value of the color value $I(x)$ of the current pixel, based on the difference values between the color value $I(x)$ of the current pixel among pixels of an image output from the image sensor 31 and the color values $\{I(x_k)\}$ of the neighboring pixels around the current pixel.

In operation 62, the image noise reducing apparatus determines unified kernel coefficients $\{b_k\}$, which represent the weights of the current pixel and the neighboring pixels, based on the similarities between the color reference value $I_R(x)$, which is determined in operation 61, and the color values $\{I(x_k)\}$ of the neighboring pixels.

In operation 63, the image noise reducing apparatus reduces the noise in the color value $I(x)$ of the current pixel by weighted-averaging the color value $I(x)$ of the current pixel and the color values $\{I(x_k)\}$ of the neighboring pixels using the unified filter kernel coefficients $\{b_k\}$ determined in operation 62.

Figure 7:
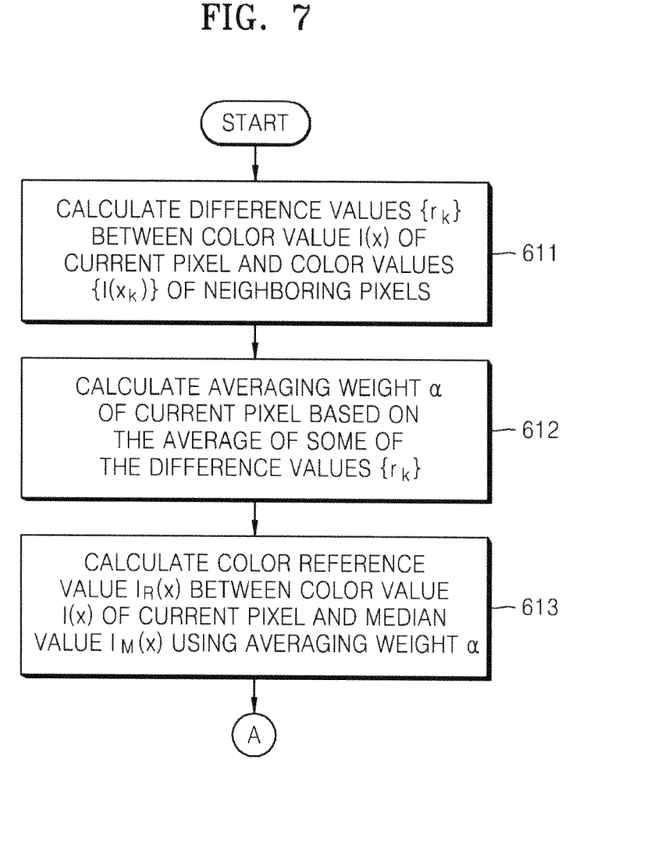
FIG. 7 is a detailed flowchart of operation 61 in FIG. 6.

FIG. 7 is a detailed flowchart of operation 61 in FIG. 6.

Referring to FIG. 7, operations in FIG. 7, which constitute operation 61, are performed in series in the color reference value determination unit 32 in FIG. 4. The above descriptions on the color reference value determination unit 32 in FIG. 4 are applied to the operations in FIG. 7, which constitute operation 61, even thought not explicitly described below.

In operation 611, the image noise reducing apparatus calculates the difference values $\{r_k\}$ between the color value $I(x)$ of the current pixel and the color values $\{I(x_k)\}$ of eight neighboring pixels which are closest to the current pixel.

In operation 612, the image noise reducing apparatus calculates an averaging weight α of the current pixel based on the average of some of the eight difference values $\{r_k\}$ calculated in operation 611 and $\sigma_{in}$, which represents the level of the impulse noise component.

In operation 613, the image noise reducing apparatus calculates the color reference value $I_R(x)$ between the color value $I(x)$ of the current pixel and the median value $I_M(x)$ of the neighboring pixels by using the averaging weight α, which is calculated in operation 612.

Figure 8:
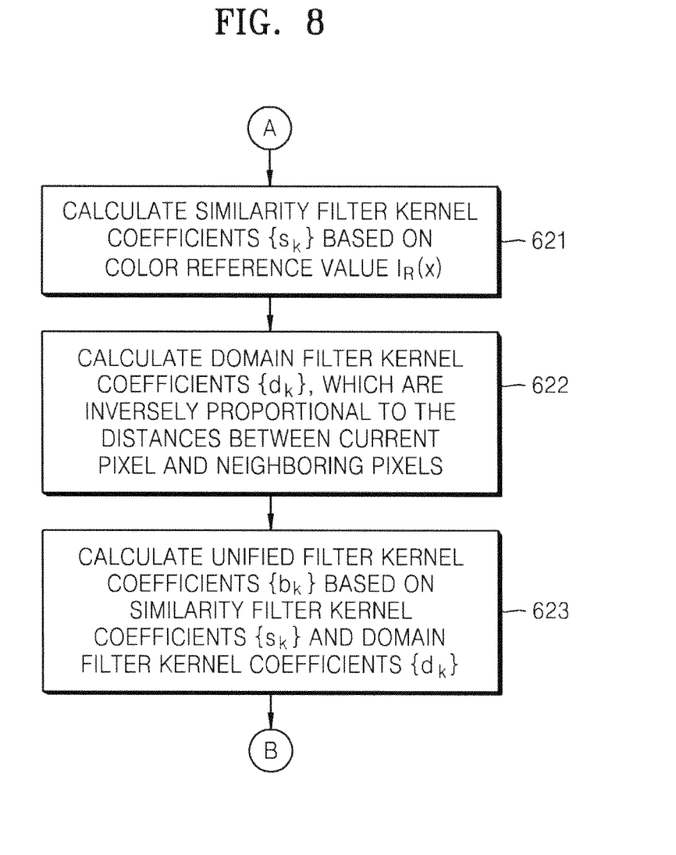
FIG. 8 is a detailed flowchart of operation 62 in FIG. 6.

FIG. 8 is a detailed flowchart of operation 62 in FIG. 6.

Referring to FIG. 8, operations in FIG. 8, which constitute operation 62, are performed in series in the unified filter kernel coefficient determination unit 33 in FIG. 5. The above descriptions on the unified filter kernel coefficient determination unit 33 in FIG. 5 are applied to the operations in FIG. 8, which constitute operation 62, even thought not explicitly described below.

In operation 621, the image noise reducing apparatus calculates similarity filter kernel coefficients $\{s_k\}$, which represent the similarities between the color reference value $I_R(x)$ of the current pixel and the color values $\{I(x_k)\}$ of the neighboring pixels, based on the difference values between the color reference value $I_R(x)$ of the current pixel and the color values $\{I(x_k)\}$ of the neighboring pixels, and $\sigma_n$, which represents the level of the white Gaussian noise.

In operation 622, the image noise reducing apparatus calculates domain filter kernel coefficients $\{d_k\}$, which are inversely proportional to the distances between the current pixel and the neighboring pixels.

In operation 623, the image noise reducing apparatus calculates unified filter kernel coefficients $\{b_k\}$, which represent the weights of the current pixel and the neighboring pixels, based on the similarity filter kernel coefficients $\{s_k\}$ calculated in operation 621 and the domain filter kernel coefficients $\{d_k\}$ calculated in operation 622.

Although the present invention has been described with reference to Formula 1 through 7, which are examples, it would be obvious to those of ordinary skill in the art that the present invention can be implemented with other formula. The embodiments of the present invention can be written as computer programs and can be implemented in general-use digital computers that execute the programs using a computer readable recording medium. In addition, the data structures used in the embodiments of the present invention can be recorded on a computer readable recording medium by a number of means. Examples of the computer readable recording medium include magnetic storage media (e.g., ROM, floppy disks, hard disks, etc.), and optical recording media (e.g., CD-ROMs, or DVDs).

According to the above embodiments, the color reference value, which corresponds to a corrected value of the color value of the current pixel, is determined, and unified filter kernel coefficients, which represent the weights of the current pixel and the neighboring pixels, are then determined based on the color reference value. Finally, the noise in the color value of the current pixel is reduced by using the unified filer kernel coefficients. As a result, various kinds of noises in the image, i.e., a white Gaussian noise and an impulse noise, can be simultaneously reduced.

Especially, according to the above embodiments, a new concept of the color reference value, which can be easily calculated, is introduced, thereby solving the problem of complexity with the conventional unified filter and simultaneously maintaining as many of fine details of the image as possible. As a result, according to the above embodiments, a unified filter with higher performance than the conventional unified filter in terms of image noise processing speed and image quality can be implemented.

Furthermore, it would be obvious to those of ordinary skill in the art that the present invention can be applied to reduce noise in a color filter array (CFA) Bayer pattern image of one color plane that is output from an image sensor equipped to a camera, and to full color images consisting of R, G, and B components, or gray images.

While this invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. An image noise reducing method comprising:
   determining a color reference value, which corresponds to a corrected value of the color value of a current pixel, based on the difference values between the color value of the current pixel among pixels of an image and the color values of neighboring pixels around the current pixel;
   determining coefficients, which represent the weights of the current pixel and the neighboring pixels, based on the similarities between the determined color reference value and the color values of the neighboring pixels and the distances between the current pixel and the neighboring pixels; and
   reducing a noise in the color value of the current pixel by weighted-averaging the color value of the current pixel and the color values of the neighboring pixels using the determined coefficients,
   wherein at least one equation used to determine the color reference value is different from at least one equation used to reduce the noise in the color value of the current pixel.

2. The image noise reducing method of claim 1, wherein the color reference value distributes between the color value of the current pixel and a median value of the color values of the neighboring pixels according to the difference values between the color value of the current pixel and the color values of the neighboring pixels.

3. An image noise reducing method comprising:
   determining a color reference value, which corresponds to a corrected value of the color value of a current pixel, based on the difference values between the color value of the current pixel among pixels of an image and the color values of neighboring pixels around the current pixel;
   determining coefficients, which represent the weights of the current pixel and the neighboring pixels, based on the similarities between the determined color reference value and the color values of the neighboring pixels; and
   reducing a noise in the color value of the current pixel by weighted-averaging the color value of the current pixel and the color values of the neighboring pixels using the determined coefficients,
   wherein the determining of the color reference value comprises:
   calculating the difference values between the color value of the current pixel and the color values of the neighboring pixels around the current pixel;
   calculating an averaging weight of the current pixel based on the average of some of the calculated difference values and a value which represents the level of an impulse noise component; and
   calculating the color reference value between the color value of the current pixel and the median value of the color values of the neighboring pixels by using the calculated averaging weight.

4. The image noise reducing method of claim 3, wherein the average of some of the calculated difference values is the average of the first and second smallest difference values among the calculated difference values.

5. An image noise reducing method comprising:
   determining a color reference value, which corresponds to a corrected value of the color value of a current pixel, based on the difference values between the color value of the current pixel among pixels of an image and the color values of neighboring pixels around the current pixel;
   determining coefficients, which represent the weights of the current pixel and the neighboring pixels, based on the similarities between the determined color reference value and the color values of the neighboring pixels; and
   reducing a noise in the color value of the current pixel by weighted-averaging the color value of the current pixel and the color values of the neighboring pixels using the determined coefficients,
   wherein the determining of the coefficients comprises:
   calculating similarity filter kernel coefficients, which represent the similarities between the color reference value of the current pixel and the color values of the neighboring pixels, based on the difference values between the color reference value of the current pixel and the color values of the neighboring pixels, and a value which represents the level of a white Gaussian noise;
   calculating domain filter kernel coefficients, which are inversely proportional to the distances between the current pixel and the neighboring pixels; and
   calculating the coefficients, which represent the weights of the current pixel and the neighboring pixels, based on the calculated similarity filter kernel coefficients and domain filter kernel coefficients.

6. The image noise reducing method of claim 1, wherein the image is a color filter array (CFA) Bayer pattern image output from an image sensor, and the neighboring pixels are pixels in the same color channel as for the current pixel.

7. A non-transitory computer readable recording medium having embodied thereon a program for an image noise reducing method comprising:
   determining a color reference value, which corresponds to a corrected value of the color value of a current pixel, based on the difference values between the color value of the current pixel among pixels of an image and the color values of neighboring pixels around the current pixel;
   determining coefficients, which represent the weights of the current pixel and the neighboring pixels, based on the similarities between the determined color reference value and the color values of the neighboring pixels and the distances between the current pixel and the neighboring pixels; and
   reducing a noise in the color value of the current pixel by weighted-averaging the color value of the current pixel and the color values of the neighboring pixels using the determined coefficients,
   wherein at least one equation used to determine the color reference value is different from at least one equation used to reduce the noise in the color value of the current pixel.

8. An image noise reducing apparatus comprising:
   a color reference value determination unit to determine a color reference value, which corresponds to a corrected value of the color value of a current pixel, based on the difference values between the color value of the current pixel among pixels of an image and the color values of neighboring pixels around the current pixel;
   a coefficient determination unit to determine coefficients, which represent the weights of the current pixel and the neighboring pixels, based on the similarities between the determined color reference value and the color values of the neighboring pixels and the distances between the current pixel and the neighboring pixels; and
   a noise reduction unit to reduce a noise in the color value of the current pixel by weighted-averaging the color value of the current pixel and the color values of the neighboring pixels using the determined coefficients, wherein at least one equation used to determine the color reference value is different from at least one equation used to reduce the noise in the color value of the current pixel, wherein at least one of the above units are performed by a processor.

9. The image noise reducing apparatus of claim 8, wherein the color reference value distributes between the color value of the current pixel and a median value of the color values of the neighboring pixels according to the difference values between the color value of the current pixel and the color values of the neighboring pixels.

10. An image noise reducing apparatus comprising:
a color reference value determination unit determining a color reference value, which corresponds to a corrected value of the color value of a current pixel, based on the difference values between the color value of the current pixel among pixels of an image and the color values of neighboring pixels around the current pixel;
a coefficient determination unit determining coefficients, which represent the weights of the current pixel and the neighboring pixels, based on the similarities between the determined color reference value and the color values of the neighboring pixels; and
a noise reduction unit reducing a noise in the color value of the current pixel by weighted-averaging the color value of the current pixel and the color values of the neighboring pixels using the determined coefficients,
wherein the color reference value determination unit comprises:
a difference value calculation portion to calculate the difference values between the color value of the current pixel and the color values of the neighboring pixels around the current pixel;
an averaging weight calculation portion to calculate an averaging weight of the current pixel based on the average of some of the calculated difference values and a value which represents the level of an impulse noise component; and
a color reference value calculation portion to calculate the color reference value between the color value of the current pixel and the median value of the color values of the neighboring pixels by using the calculated averaging weight,
wherein at least one of the above units are performed by a processor.

11. The image noise reducing apparatus of claim 10, wherein the average of some of the calculated difference values is the average of the first and second smallest difference values among the calculated difference values.

12. An image noise reducing apparatus comprising:
a color reference value determination unit determining a color reference value, which corresponds to a corrected value of the color value of a current pixel, based on the difference values between the color value of the current pixel among pixels of an image and the color values of neighboring pixels around the current pixel;
a coefficient determination unit determining coefficients, which represent the weights of the current pixel and the neighboring pixels, based on the similarities between the determined color reference value and the color values of the neighboring pixels; and
a noise reduction unit reducing a noise in the color value of the current pixel by weighted-averaging the color value of the current pixel and the color values of the neighboring pixels using the determined coefficients,
wherein the coefficient determination unit comprises:
a similarity filter kernel coefficient calculation portion to calculate similarity filter kernel coefficients, which represent the similarities between the color reference value of the current pixel and the color values of the neighboring pixels, based on the difference values between the color reference value of the current pixel and the color values of the neighboring pixels, and a value which represents the level of a white Gaussian noise;
a domain filter kernel coefficient calculation portion to calculate domain filter kernel coefficients, which are inversely proportional to the distances between the current pixel and the neighboring pixels; and
an unified filter kernel coefficient calculation portion to calculate the coefficients, which represent the weights of the current pixel and the neighboring pixels, based on the calculated similarity filter kernel coefficients and domain filter kernel coefficients,
wherein at least one of the above units are performed by a processor.

13. The image noise reducing apparatus of claim 8, wherein the image is a color filter array (CFA) Bayer pattern image output from an image sensor, and the neighboring pixels are pixels in the same color channel as for the current pixel.

* * * * *